United States Patent [19]

Evans et al.

[11] 4,208,877
[45] Jun. 24, 1980

[54] DEVICE FOR EXTRACTING ENERGY FROM WAVES

[76] Inventors: David V. Evans; John P. Davis; Thomas L. Shaw, all of United Kingdom Atomic Energy Authority, 11 Charles II St., London, SW1, England

[21] Appl. No.: 16,024

[22] Filed: Feb. 28, 1979

[30] Foreign Application Priority Data

Mar. 1, 1978 [GB] United Kingdom ................. 8059/78

[51] Int. Cl.² .............................................. F03B 13/12
[52] U.S. Cl. ....................................... 60/495; 60/504; 290/53; 417/330
[58] Field of Search ................. 60/495, 496, 497, 502, 60/504, 505, 398; 185/29, 30, 33; 290/42, 53; 405/75, 76; 417/330, 331, 333, 337

[56] References Cited

U.S. PATENT DOCUMENTS 1,318,469  10/1919  Wilkinson ............................. 60/504

OTHER PUBLICATIONS

Paper entitled, "A Theory for Wave-Power Absorption by Oscillating Bodies", by D. V. Evans, Publ. in "Journal of Fluid Mechanics", Part 1, pp. 1-25.

Primary Examiner—Edgar W. Geoghegan
Attorney, Agent, or Firm—Larson, Taylor and Hinds

[57] ABSTRACT

A device for extracting energy from sea waves by the motion of a submerged cylinder held normal to the direction of motion of the waves by tie members at each end of the cylinder. The tie members at their other respective ends are moored to the sea bed. Changes in the load on the tie members are arranged to turn in one direction a drum drivably connected to a vane pump. A spring, or a counterweight acting on a cam-shaped pulley, is arranged to apply a biasing load to the drum in the other direction so as to produce an oscillatory movement of the drum from changes in load on the tie members and drive the pump. A hydraulic motor connected to an electric generator is driven by the pump.

The drum may be situated at the moorings on the sea bed, or at the cylinder.

12 Claims, 12 Drawing Figures

DEVICE FOR EXTRACTING ENERGY FROM WAVES

This invention relates to devices for extracting energy from wave energy.

According to the present invention, there is provided a device for extracting energy from waves on a liquid, the device comprising a substantially circular cylinder adapted to have positive buoyancy in the liquid, a plurality of tie members adapted to hold the cylinder below the surface of the liquid and transverse to the direction of motion of the waves so as to subject the cylinder to the effect of the waves, and means for performing useful work from changes in the load on at least some of the members as a result of motion of the cylinder in response to the waves.

Preferably, at least some of the tie members are arranged to be held from the bed of the liquid by the work performing means.

Alternatively, the work performing means may be situated at the cylinder.

The work performing means may comprise a rotary member to which a said tie member is attachable so as to turn said rotary member in one direction, a biasing means for biasing said rotary member to turn in the opposite direction, and hydraulic pump means arranged to be actuated by oscillatory movement of the rotary member.

The tie member may be of flexible or of rigid form.

When a long submerged circular cylinder rotates on an eccentric axis parallel to its own, the waves produced on the free surface of the liquid travel away from the cylinder in one direction only. It has been shown in a paper entitled "A theory for wave power absorption by damped oscillating bodies" by D. V. Evans, published in Journal of Fluid Mechanics 1976 Vol. 77, and incorporated by reference herein, that the reverse is true, namely, by correctly loading the cylinder substantially all the incident wave energy can be absorbed from a regular wave of small amplitude and given frequency. The invention by combining the mooring of such a cylinder with an energy extraction system seeks to use this property of a rotating submerged cylinder to overcome some of the problems currently associated with some other wave energy devices. For example, that part of the device of the invention actually moving in the waves is a simple structure whose buoyancy is not critical, and as the device is completely submerged, difficulties one would meet at the surface environment are avoided.

The invention provides for energy to be extracted from both the vertical and horizontal modes of motion of the cylinder.

The invention will now be further described by way of example only with reference to the accompanying drawings in which:

FIG. 2a shows a plan diagrammatic representation of the device of FIG. 1a;

In the above Figures like parts have like numerals.

Figure 1:
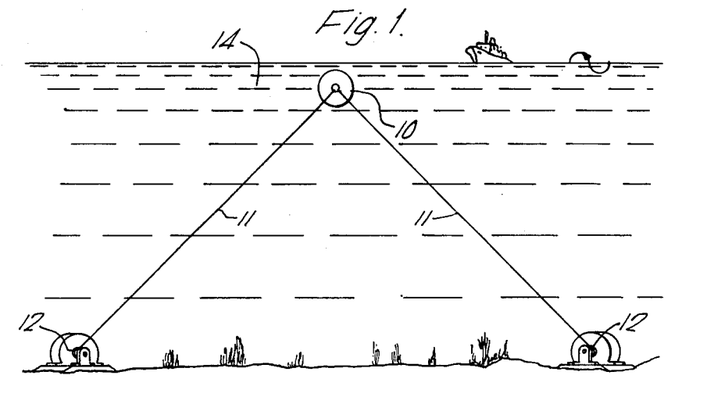
FIG. 1 shows a side diagrammatic representation of a device for extracting energy from waves.
Figure 2:
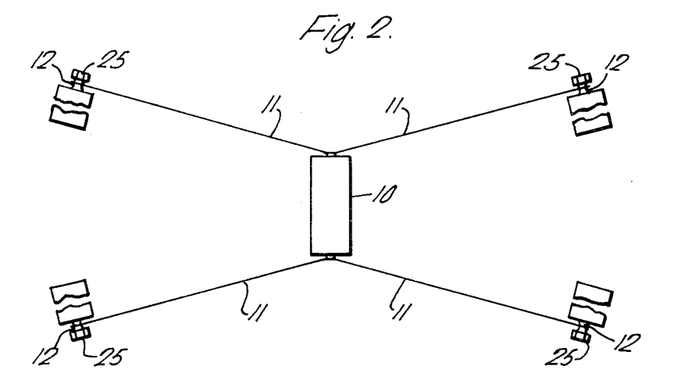
FIG. 2 shows a plan diagrammatic representation of the device of FIG. 1.

Referring now to FIG. 1 and FIG. 2, the device shown comprises a circular cylinder 10 held just below the surface of a liquid 14 (e.g. the sea) by four tie members in the form of conventional steel link chains 11 two at each end of the cylinder and each attached at the other end thereof to a winding drum 12 fixed to the sea bed. The drums 12 are positioned so as to align the chains 11 at approximately 45° to the vertical in the mean position of the cylinder 10, and to present an outwardly splayed alignment of the chains 11 with respect to the ends of the cylinder 10.

Figure 3:
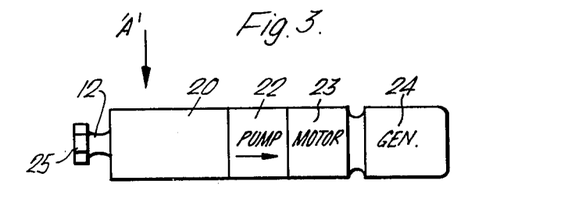
FIG. 3 shows a plan diagrammatic representation of part of the device of FIG. 1.
Figure 3A:
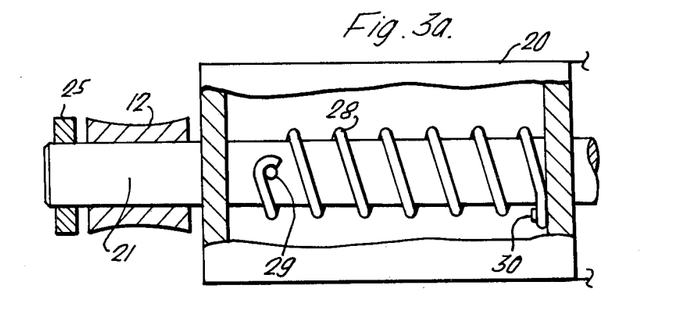
FIG. 3a shows to an enlarged scale a fragmentary part-sectional view in the direction of arrow 'A' of FIG. 3.

Each drum 12 as shown in FIGS. 3 and 3a to which reference is now made, is mounted on a shaft 21 extending through a housing 20 and is connected to a vane pump 22 itself connected to a hydraulic motor 23 which is arranged to drive an electric generator 24. The end of the shaft 21 adjacent to the drum 12 is supported by a bearing member 25. A biasing means comprising a torsion spring 28 is fitted around the shaft 21, and has one end hooked around a peg 29 in the shaft 21 and the other end thereof hooked around a peg 30 in the wall of the housing 20. The torsion spring 28 is selected so as to maintain the tension in the chain 11 to hold the cylinder 10 below the surface of the sea 14, and ensure that the device resonates at the design wave frequency.

In operation, in flat calm seas the upward force on the cylinder 10 due to its buoyancy would be equal to the downward tension of the chains 11 due to the effect of the torsion springs 28 on the respective drums 12. When the cylinder 10 is forced by a wave in a direction normal to the cylinder 10 to move in a direction such that the tension in a chain 11 reduces, the torsion spring 28, which acts on this chain 11, unwinds and turns the shaft 21 and the drum 12 associated therewith which winds up the chain 11 and takes up the slack in the chain 11. When the cylinder 10 is forced by a wave to pull on this chain 11, the tension in the chain 11 turns the drum 12 and winds up the torsion spring 28.

The cylinder 10 performs a characteristic circular orbit in the vertical plane aligned in the direction of motion of waves, and as a result of the changes in the tension in the chains 11, the drums 12 and shaft 21 oscillate and drive the respective vane pumps 22 which thereby drive the hydraulic motors 23 to which they are connected which thus drive the electric generators 24 to provide an electrical energy output from the energy extracted from the waves.

In one application of the invention, a cylinder 10 having a diameter of up to about fifteen meters and a length about two to three times its diameter may be positioned about three meters below the mean surface of the sea, and the drum 12 may be of a diameter to provide approximately 270° rotation.

If considered desirable, the cylinder 10 could be lowered into safety in the event of a particularly severe storm. This could be achieved by adjusting the buoyancy of the cylinder 10 in response to a sensing device (not shown) for sensing the tension in the chains 11.

Instead of a biasing means in the form of a torsion spring 28 to tension the chains 11 alternative resilient means may be used such as a pneumatic cushion (not shown).

Figure 4:
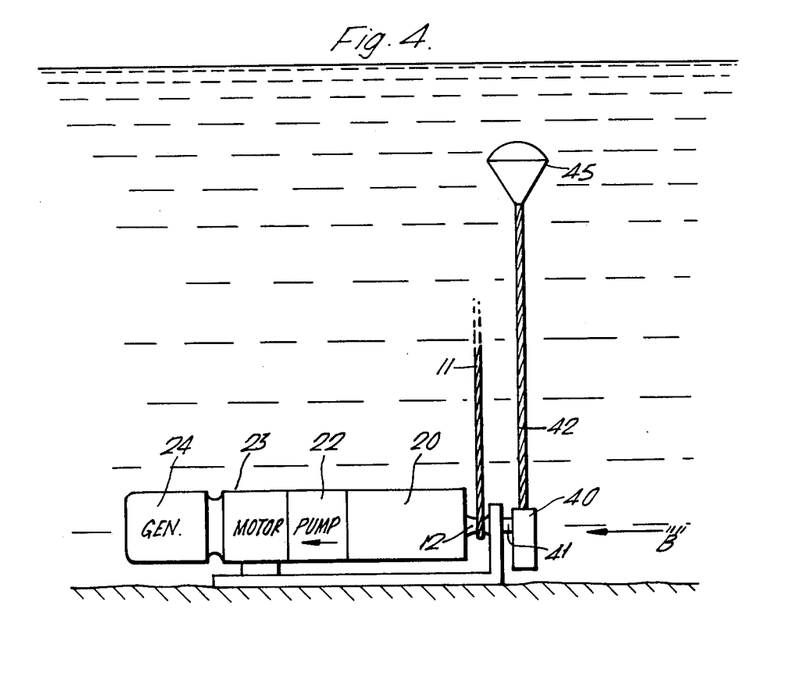
FIG. 4 shows a side diagrammatic representation of an alternative arrangement to that shown in FIG. 3.
Figure 4A:
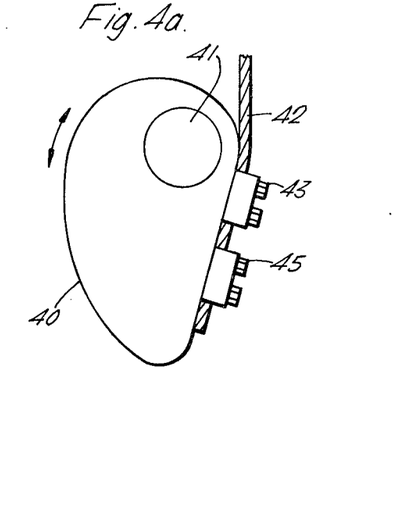
FIG. 4a shows to an enlarged scale a fragmentary view in the direction of arrow 'B' of FIG. 4.

Alternatively, the arrangement shown in FIGS. 4 and 4a may be used, and referring to FIGS. 4 and 4a, a cam-shaped pulley 40 is fitted on an extension 41 of the shaft 21 (not shown) and has a cable 42 rigidly clamped to the return portion of the pulley 40 by two clamps 43. A buoy 45 at the other end of the cable 42 is arranged to be held below the surface so as to apply a tension to the cable 42 from the displacement forces acting on the buoy 45.

In operation, tightening of the chain 11 causes the drum 12 and thereby the pulley 40 to rotate, and the cam-shaped profile of the pulley 40 increasingly displaces the cable 42 away from the axis of the pulley 40. Because of the upward load on the cable 42 from the buoy 45, an increasing torque is applied to the shaft 21 by the rotation of the pulley 40. When the chain 11 slackens, the torque on the shaft 21 from the pulley 40 rotates the shaft 21 and the drum 12, and takes up the slack in the chain 11 in the same way as that described in relation to the torsion spring 28 of FIG. 3a.

Figure 4B:
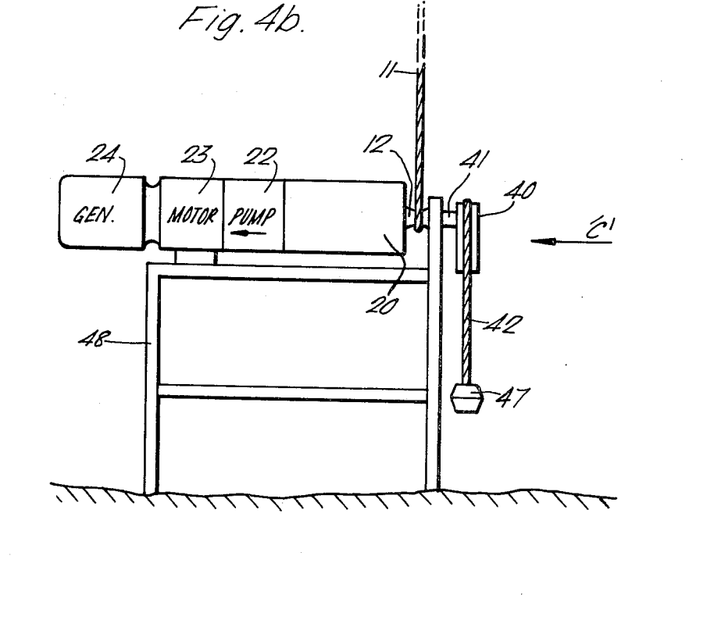
FIG. 4b shows a side diagrammatic representation of a modified form of the arrangement of FIG. 4.
Figure 4C:
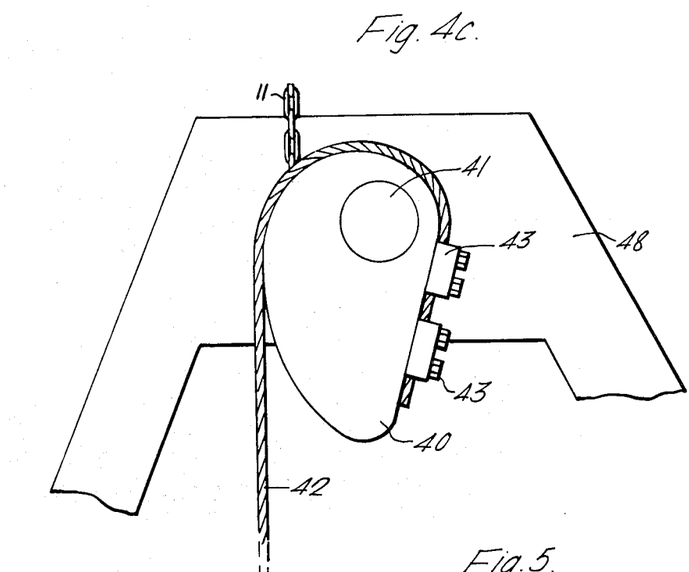
FIG. 4c shows to an enlarged scale a fragmentary view in the direction of arrow 'C' of FIG. 4b.

As an alternative to the use of a buoy 45 to apply a load to the cable 42, the modified arrangement shown in FIG. 4b may be used. As shown in FIG. 4b and FIG. 4c to which reference is made, the cable 42 of FIG. 4 now hangs from the cam-shaped pulley 40 and is connected to a weight 47 which thus applies a load on the cable 42 to perform the same function as the load applied to the cable 42 by the buoy 45. A stand 48 on the sea bed displaces the drum 12, pump 22, motor 23, and generator 24 from the sea bed so as to provide sufficient space for the vertical movement of the weight 47. In other respects the arrangement of FIG. 4b is identical to that shown in FIG. 4.

Although the use of link chains 11 is preferred, other tie members such as cables may be used but allowance may have to be made for catenary effects on the tension in the cables. Alternatively, rigid tie members may be used. The chains 11 have been shown as extending at about 45° to the vertical in the mean position of the cylinder 10, and although this is the preferred arrangement to allow the required circular orbit of the cylinder 10, other angular alignments of the chains 11 may be used for particular applications.

The cylinder 10 has been shown as having flat ends, but curved ends may be provided and might reduce viscous losses, and other shapes may be used to suit a particular application.

Figure 1A:
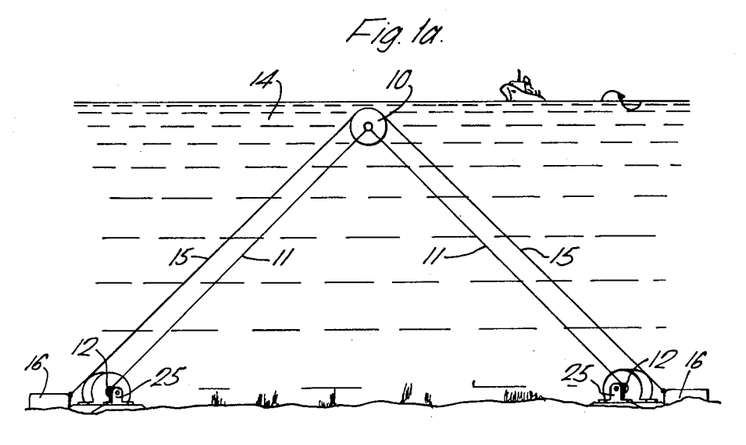
FIG. 1a shows a side diagrammatic representation of a modified form of the device of FIG. 1.
Figure 2A:
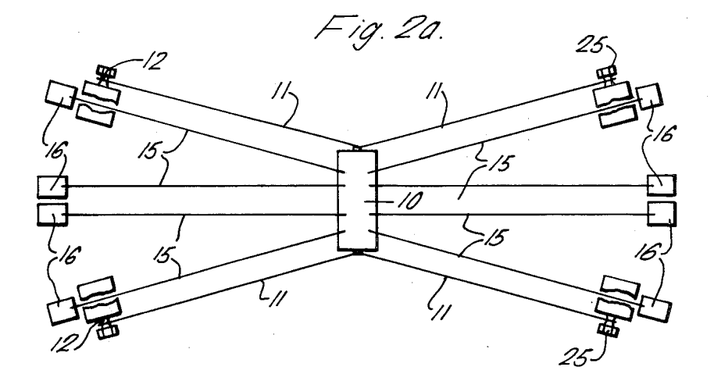

More than two tie members may be provided at each end of the cylinder, all of them being used to extract energy from motion of the cylinder 10, or some being used to share the load but without the extraction of energy from changes in the load on them as shown in FIGS. 1a and 2a to which reference is made. In FIGS. 1a and 2a the device of FIGS. 1 and 2 is provided with additional tie members in the form of resiliently extensible cables 15 of a material such as Paraffil each attached at one end to the circular side of the cylinder 10 and at the other end thereof to a respective sea bed mooring 16. Four such cables 15 are provided at each side of the cylinder 10, the inner two cables 15 at each side extending normal to the cylinder 10 and the outer two cables 15 at each side extending parallel to the respective chain 11 at that end of the cylinder 10. Each mooring 16 is positioned so as to align the respective cable 15 at an angle of approximately 45° to the vertical at the mean position of the cylinder 10.

In operation, part of the load to restrain the cylinder 10 is taken by the cables 15 to reduce the load on the chains 11, the extension of the cables 15 under the load applied by the cylinder 10 and any catenary effects on the cables 15 permitting the required motion of the cylinder 10, energy being extracted by the changes in the load on the chains 11.

Seawater may be used as the hydraulic fluid in the pump 22 and motor 23, although other hydraulic fluids may be used instead.

The invention has been described in relation to extracting energy at the sea bed from the movements of a cylinder in response to waves, but this energy may be extracted at the cylinder itself. For example as shown in FIG. 5 to which reference is made.

Figure 5:
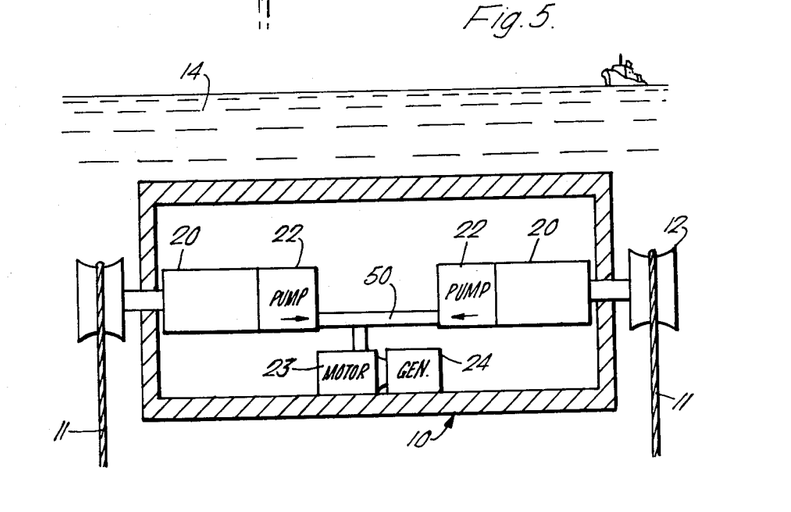
FIG. 5 shows a side diagrammatic representation of an alternative part of the device of FIG. 1.

In FIG. 5, the drum 12 and vane pump 22 of FIG. 3 and FIG. 4 are located at the cylinder 10, and at each end thereof, but both pumps 22 discharge through a T-shaped duct 50 to a single hydraulic motor 23 which is arranged to drive an electric generator 24. The chains 11 are attached to their respective drums 12 and function in a similar manner to that described in relation to FIGS. 1 to 4. The pumps 22 may also be used to flood a buoyancy chamber (not shown) in the cylinder 10, and subsequently empty the buoyancy chamber to alter the height at which the cylinder 10 is held in the sea in response to a sensing means for sensing the tension in the cables 11 and maintaining this tension within predetermined limits, or alternatively by the use of trip devices (not shown) on the shaft 21 to operate on excessive rotation of the shaft 21 resulting from excessive movement of the cylinder 10. Alternatively, the buoyancy chamber when flooded by the pumps 22 may be evacuated by use of compressed air. If desired the biasing arrangement of FIG. 4b may be used in the device of FIG. 5.

Figure 6:
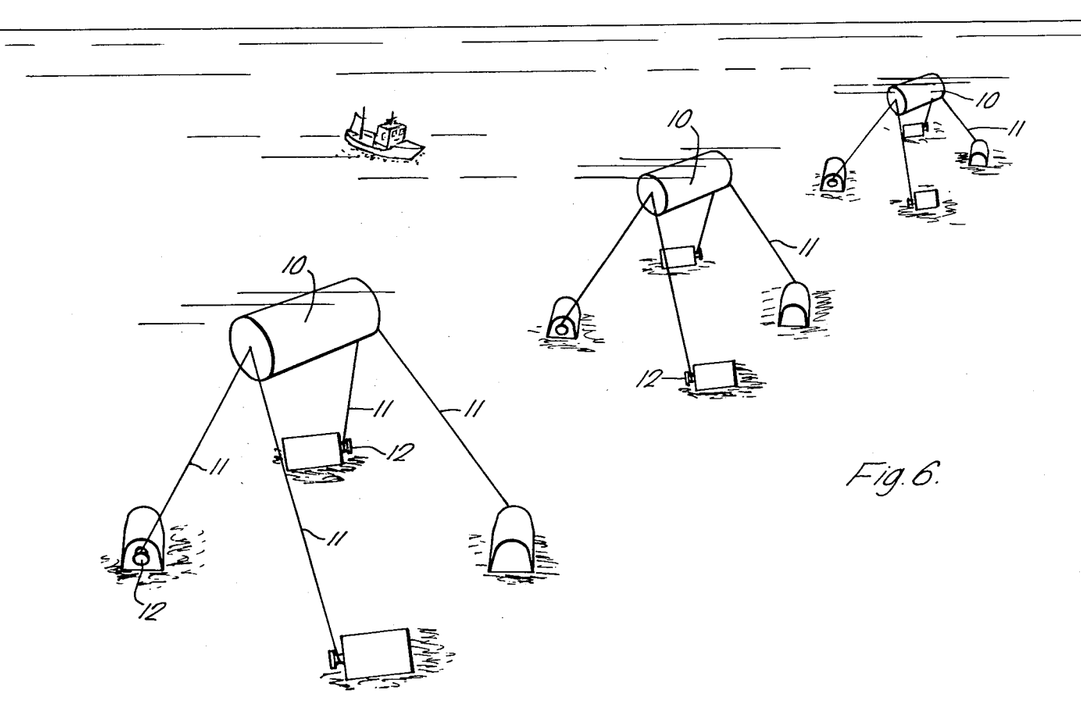
FIG. 6 shows a perspective representative of three of the devices of FIG. 1.

It will be understood that a number of the devices may be conveniently situated at a location as shown in FIG. 6, to take advantage of suitable wave conditions.

We claim:

1. A device for extracting energy from waves on a liquid, the device comprising,
    (a) a substantially circular cylinder adapted to have positive buoyancy in the liquid;
    (b) a plurality of tie members each attachable to the cylinder;
    (c) submersible mooring means for each tie member, said mooring means and the tie members being arranged in operation to hold the cylinder below the surface of the liquid and transverse to the direction of motion of the waves so as to subject the cylinder to the effect of the waves, and
    (d) means for performing useful work from changes in the load on at least some of the tie members as a result of motion of the cylinder in response to the waves.

2. A device as claimed in claim 1, wherein the work performing means is incorporated in the mooring means.

3. A device as claimed in claim 1, wherein the work performing means is incorporated in the cylinder.

4. A device as claimed in claim 1, wherein two said tie members are attachable at each end of the cylinder, and the means performs useful work from changes in the load on said two tie members.

5. A device as claimed in claim 1, wherein some of said tie members are attachable to the cylinder between the ends thereof and comprise resiliently extensible material.

6. A device as claimed in claim 1, wherein the work performing means comprises,
   (a) a rotary member to which a said tie member is attachable so as to turn said rotary member in one direction;
   (b) a biasing means for biasing said rotary member to turn in the other direction thereof, and
   (c) hydraulic pump means arranged to be actuated by movement of the rotary member.

7. A device as claimed in claim 6, including a hydraulic motor connectable to the pump means, and an electric generator connectable to the motor.

8. A device as claimed in claim 6, wherein the rotary member comprises a pulley around which a flexible said tie member is attachable.

9. A device as claimed in claim 6, wherein the biasing means comprises resilient means.

10. A device as claimed in claim 6, wherein the biasing means comprises,
    (a) a cam-shaped pulley connectable to the rotary member so as to turn therewith;
    (b) a flexible tie member connectable at one end to the cam-shaped pulley so as to lie therearound and be radially displaced by rotary movement of the cam-shaped pulley, and
    (c) a load applying member to which the other end of said flexible member is connectable for loading the tie member and thereby applying a biasing load on the rotary member in use of the biasing means.

11. A device as claimed in claim 10, wherein the load applying member comprises a buoy, and the length of the flexible tie member is arranged so as to hold the buoy below the surface of the liquid.

12. A method of extracting energy from the effect of waves on a liquid on a substantially circular cylinder having positive buoyancy in the liquid, the method comprising,
    (a) holding the cylinder below the waves by a plurality of tie members attached to the cylinder, and
    (b) performing useful work by means connected to at least some of the tie members from changes in the load on said some tie members as a result of motion of the cylinder in response to the waves.

* * * * *

UNITED STATES PATENT AND TRADEMARK OFFICE
CERTIFICATE OF CORRECTION

PATENT NO. : 4,208,877
DATED : June 24, 1980
INVENTOR(S) : David V. Evans et al.

It is certified that error appears in the above—identified patent and that said Letters Patent is hereby corrected as shown below:

On the first sheet of the drawing, under "Foreign Application Priority Data," there should additionally be inserted --

Feb. 16, 1979    United Kingdon........ 5628/79 --.

Signed and Sealed this

Ninth Day of December 1980

[SEAL]

Attest:

SIDNEY A. DIAMOND

Attesting Officer    Commissioner of Patents and Trademarks